United States Patent
McGuire, Jr.

(10) Patent No.: US 8,599,514 B2
(45) Date of Patent: Dec. 3, 2013

(54) STABILIZATION OF COMPONENTS WITHIN HARD DISK DRIVES AND RELATED METHODS

(75) Inventor: James E. McGuire, Jr., Westerville, OH (US)

(73) Assignee: entrotech, inc., Columbus, OH (US)

( * ) Notice: Subject to any disclaimer, the term of this patent is extended or adjusted under 35 U.S.C. 154(b) by 87 days.

(21) Appl. No.: 13/096,878

(22) Filed: Apr. 28, 2011

(65) Prior Publication Data

US 2012/0275055 A1    Nov. 1, 2012

(51) Int. Cl.
*G11B 33/14*  (2006.01)
*G11B 17/02*  (2006.01)

(52) U.S. Cl.
USPC ................................ 360/97.15; 360/99.16

(58) Field of Classification Search
USPC ................ 360/99.13, 99.14, 97.15, 99.16
See application file for complete search history.

(56) References Cited

U.S. PATENT DOCUMENTS

| | | | |
|---|---|---|---|
| 4,306,259 A * | 12/1981 | Saito et al. ............... | 360/99.01 |
| 4,367,503 A | 1/1983 | Treseder | |
| 4,642,715 A * | 2/1987 | Ende .......................... | 360/97.18 |
| 4,686,592 A | 8/1987 | Carroll et al. | |
| 4,855,849 A | 8/1989 | Jones et al. | |
| 4,965,691 A * | 10/1990 | Iftikar et al. ............ | 360/133 |
| 5,025,335 A | 6/1991 | Stefansky | |
| 5,175,657 A * | 12/1992 | Iftikar et al. ............. | 360/98.01 |
| 5,214,550 A * | 5/1993 | Chan ........................ | 360/99.13 |
| 5,233,491 A | 8/1993 | Kadonaga et al. | |
| 5,235,481 A * | 8/1993 | Kamo et al. ............. | 360/99.13 |
| 5,243,495 A * | 9/1993 | Read et al. ............... | 361/679.31 |
| 5,247,410 A * | 9/1993 | Ebihara et al. ........... | 360/264.9 |
| 5,253,129 A * | 10/1993 | Blackborow et al. ...... | 360/69 |
| 5,270,887 A | 12/1993 | Edwards et al. | |
| 5,282,099 A | 1/1994 | Kawagoe et al. | |
| 5,317,463 A | 5/1994 | Lemke et al. | |
| 5,454,157 A | 10/1995 | Ananth et al. | |
| 5,536,917 A | 7/1996 | Suppelsa et al. | |
| 5,587,854 A | 12/1996 | Sato et al. | |
| 5,587,855 A * | 12/1996 | Kim ........................ | 360/99.16 |
| 5,608,592 A | 3/1997 | Mizoshita et al. | |

(Continued)

FOREIGN PATENT DOCUMENTS

| | | |
|---|---|---|
| EP | 0 546 680 | 6/1993 |
| WO | WO 2005/117018 | 12/2005 |

OTHER PUBLICATIONS

"Donaldson Filtration Systems Adsorbent Label Filter (ALF): Disk Drive," Donaldson Company, Inc., Minneapolis, MN (Jul. 31, 2010).

(Continued)

*Primary Examiner* — Brian Miller
(74) *Attorney, Agent, or Firm* — The Griffith Law Firm, A.P.C.; Lisa M. Griffith

(57) ABSTRACT

A hard disk drive of the invention comprises: a housing comprising a base and a cover; an insert positioned on an interior surface of the base of the housing for stabilization of one or more components within the hard disk drive during operation of the hard disk drive, wherein the insert is relatively stiff as compared to stiffness of the base; and the at least one of the one or more components mounted on the insert. Methods for forming such hard disk drives and hard disk drive rack assemblies comprising the hard disk drives are also disclosed.

19 Claims, 3 Drawing Sheets

(56) References Cited

U.S. PATENT DOCUMENTS

| | | | |
|---|---|---|---|
| 5,703,735 A | 12/1997 | Bleeke | |
| 5,732,063 A * | 3/1998 | Chen | 720/698 |
| 5,751,514 A * | 5/1998 | Hyde et al. | 360/97.21 |
| 5,781,373 A * | 7/1998 | Larson et al. | 360/99.19 |
| 5,837,934 A * | 11/1998 | Valavanis et al. | 174/544 |
| 5,880,904 A * | 3/1999 | Mizoshita et al. | 360/97.16 |
| 5,898,537 A * | 4/1999 | Oizumi et al. | 360/99.18 |
| 5,969,901 A | 10/1999 | Eckberg et al. | |
| 6,008,965 A | 12/1999 | Izumi et al. | |
| 6,023,392 A * | 2/2000 | Kim | 360/99.18 |
| 6,108,164 A * | 8/2000 | Weber, Jr. | 360/97.16 |
| 6,129,579 A | 10/2000 | Cox et al. | |
| 6,168,459 B1 | 1/2001 | Cox et al. | |
| 6,181,530 B1 * | 1/2001 | Ratliff et al. | 360/265.8 |
| 6,226,143 B1 | 5/2001 | Stefanksy | |
| 6,236,532 B1 | 5/2001 | Yanagisawa | |
| 6,243,262 B1 | 6/2001 | Koo et al. | |
| 6,317,286 B1 | 11/2001 | Murphy et al. | |
| 6,392,838 B1 | 5/2002 | Hearn et al. | |
| 6,397,932 B1 * | 6/2002 | Calaman et al. | 165/80.4 |
| 6,407,659 B2 | 6/2002 | Mochida et al. | |
| 6,430,000 B1 | 8/2002 | Rent | |
| 6,442,021 B1 * | 8/2002 | Bolognia et al. | 361/679.34 |
| 6,469,864 B2 | 10/2002 | Kamezawa et al. | |
| 6,473,264 B2 | 10/2002 | Bae et al. | |
| 6,480,353 B1 * | 11/2002 | Sacks et al. | 360/99.13 |
| 6,525,899 B2 | 2/2003 | Hearn et al. | |
| 6,560,064 B1 | 5/2003 | Hirano | |
| 6,570,736 B2 * | 5/2003 | Noda | 360/99.18 |
| 6,639,757 B2 * | 10/2003 | Morley et al. | 360/245.9 |
| 6,646,821 B2 | 11/2003 | Bernett et al. | |
| 6,650,961 B2 * | 11/2003 | Deckers | 700/213 |
| 6,678,112 B1 | 1/2004 | Kaneko | |
| 6,693,767 B1 | 2/2004 | Butler | |
| 6,762,909 B2 | 7/2004 | Albrecht et al. | |
| 6,765,751 B2 * | 7/2004 | Huang et al. | 360/99.14 |
| 6,785,082 B2 | 8/2004 | Fiorvanti et al. | |
| 6,831,811 B1 | 12/2004 | Andrikowich et al. | |
| 6,876,514 B1 | 4/2005 | Little | |
| 6,934,118 B2 * | 8/2005 | Hidaka et al. | 360/99.13 |
| 6,934,958 B2 * | 8/2005 | Lin et al. | 720/649 |
| 6,940,687 B2 | 9/2005 | Hong et al. | |
| 7,054,153 B2 * | 5/2006 | Lewis et al. | 361/679.33 |
| 7,082,012 B2 | 7/2006 | Macpherson et al. | |
| 7,119,984 B2 | 10/2006 | Macleod et al. | |
| 7,206,164 B2 | 4/2007 | Hofland et al. | |
| 7,218,473 B2 | 5/2007 | Bernett et al. | |
| 7,239,593 B2 * | 7/2007 | Abe | 369/75.11 |
| 7,274,534 B1 | 9/2007 | Choy et al. | |
| 7,300,500 B2 | 11/2007 | Okada et al. | |
| 7,301,776 B1 | 11/2007 | Wang et al. | |
| 7,315,447 B2 | 1/2008 | Inoue et al. | |
| 7,330,334 B2 | 2/2008 | Shimizu et al. | |
| 7,362,541 B2 | 4/2008 | Bernett et al. | |
| 7,414,813 B2 | 8/2008 | Huynh | |
| 7,420,771 B1 | 9/2008 | Hanke et al. | |
| 7,484,291 B1 * | 2/2009 | Ostrander et al. | 29/603.03 |
| 7,508,622 B2 * | 3/2009 | Martin et al. | 360/99.13 |
| 7,525,758 B2 | 4/2009 | Abe | |
| 7,616,400 B2 * | 11/2009 | Byun et al. | 360/99.13 |
| 7,630,169 B2 | 12/2009 | Murakami | |
| 7,684,146 B1 | 3/2010 | Andrikowich et al. | |
| 7,813,129 B2 | 10/2010 | Van Der Werff | |
| 8,014,167 B2 | 9/2011 | Gunderson et al. | |
| 8,018,687 B1 | 9/2011 | Little et al. | |
| 8,248,777 B2 | 8/2012 | Prest | |
| 8,274,755 B2 * | 9/2012 | Ishima et al. | 360/97.14 |
| 8,427,787 B2 | 4/2013 | McGuire | |
| 2001/0042301 A1 * | 11/2001 | Khuu | 29/603.03 |
| 2002/0149885 A1 | 10/2002 | Dague et al. | |
| 2002/0196580 A1 * | 12/2002 | Tsukahara et al. | 360/97.01 |
| 2003/0081349 A1 | 5/2003 | Bernett | |
| 2003/0089417 A1 | 5/2003 | Bernett | |
| 2003/0179488 A1 | 9/2003 | Kant et al. | |
| 2003/0179489 A1 | 9/2003 | Bernett et al. | |
| 2003/0223148 A1 | 12/2003 | Macleod et al. | |
| 2004/0150909 A1 * | 8/2004 | Kimura et al. | 360/97.01 |
| 2004/0169956 A1 * | 9/2004 | Oba et al. | 360/97.02 |
| 2004/0184184 A1 | 9/2004 | Komatsu et al. | |
| 2004/0207980 A1 | 10/2004 | Kobayashi | |
| 2005/0013039 A1 * | 1/2005 | Matsumura et al. | 360/97.01 |
| 2005/0094312 A1 * | 5/2005 | Sato | 360/97.01 |
| 2005/0130457 A1 | 6/2005 | Nozaki et al. | |
| 2006/0050429 A1 | 3/2006 | Gunderson et al. | |
| 2007/0002489 A1 | 1/2007 | Abe | |
| 2007/0171567 A1 | 7/2007 | Choi et al. | |
| 2008/0174910 A1 | 7/2008 | Hirono et al. | |
| 2008/0212237 A1 | 9/2008 | Uefune et al. | |
| 2008/0226534 A1 | 9/2008 | Gidumal et al. | |
| 2009/0073328 A1 | 3/2009 | Gunderson et al. | |
| 2009/0073842 A1 * | 3/2009 | Kim | 369/75.11 |
| 2009/0116141 A1 | 5/2009 | Brown | |
| 2009/0183475 A1 | 7/2009 | Dauber et al. | |
| 2011/0122567 A1 | 5/2011 | Cheah et al. | |
| 2011/0212281 A1 | 9/2011 | Jacoby et al. | |
| 2012/0275052 A1 | 11/2012 | McGuire | |
| 2012/0275053 A1 | 11/2012 | McGuire | |
| 2012/0275054 A1 | 11/2012 | McGuire | |
| 2012/0275056 A1 | 11/2012 | McGuire | |
| 2012/0275057 A1 | 11/2012 | McGuire | |
| 2012/0275105 A1 | 11/2012 | McGuire | |
| 2012/0275106 A1 | 11/2012 | McGuire | |
| 2012/0275285 A1 | 11/2012 | McGuire | |
| 2012/0275286 A1 | 11/2012 | McGuire | |
| 2012/0275287 A1 | 11/2012 | McGuire | |

OTHER PUBLICATIONS

"Donaldson Filtration Systems Adsorbent Pouch Filter (APF): Disk Drive," Donaldson Company, Inc., Minneapolis, MN (Jul. 31, 2010).
"Infrared," http://en.wikipedia.org/wiki/Infrared (Feb. 14, 2011).
"Laser Makes Invisible Welds in Plastics," Connect, No. 100; http://www.twi.co.uk/content/c1008b.html (May 31, 1999).
"Laser Welding of Plastics (Knowledge Summary)," http://www.twi.co.uk/content/ksab002.html (Dec. 31, 2009).
"Nd:YAG laser," http://en.wikipedia.org/wiki/Nd:YAG_laser (Feb. 14, 2011).
Jones, Ian, "Clearweld (Knowledge Summary)," http://www.twi.co.uk/content/ksiaj001.html (Dec. 31, 2010).
Venkat, Sri et al., "Sealing Plastic Seams With Laser Welding," www.devicelink.com/mddi (May 31, 2008).
Warwick, Marcus et al., "Application Studies Using Through-Transmission Laser Welding of Polymers," http://www.twi.co.uk/content/spcmwapr2006.html (Apr. 25, 2006).

* cited by examiner

STABILIZATION OF COMPONENTS WITHIN HARD DISK DRIVES AND RELATED METHODS

BACKGROUND OF THE INVENTION

The present invention relates generally to stabilization of components within hard disk drives and related methods.

A disk drive is a device used to store information in a computing environment. In a disk drive, data is generally recorded on planar, round, rotating surfaces (which are commonly referred to as disks, discs, or platters). There are several types of disk drives, including optical disk drives, floppy disk drives, and hard disk drives. Nowadays, hard disk drives tend to be most common. Strictly speaking, "drive" refers to a device distinct from its medium, such as a tape drive and its tape, or a floppy disk drive and its floppy disk. A hard disk drive (sometimes referred to as a HDD), also referred to as a hard drive, hard disk, or fixed disk drive, is a non-volatile storage device that stores digitally encoded data on rapidly rotating platters with magnetic surfaces. Early hard disk drives had removable media; however, a HDD today is typically an encased unit with fixed media.

A typical hard disk drive includes a head disk assembly (HDA) and a printed circuit board assembly (PCBA) attached to a disk drive base of the HDA. The HDA typically includes at least one magnetic disk, a spindle motor for rotating the disk, and a head stack assembly (HSA) having an actuator assembly with at least one transducer head, typically several, for reading and writing data from the disk. The PCBA includes a servo control system in the form of a disk controller for generating servo control signals. The HSA is controllably positioned in response to the generated servo control signals from the disk controller. In so doing, the attached heads are moved relative to tracks disposed upon the disk. The heads are typically distanced from the magnetic disk by a gaseous cushion—so that they are said to "fly" over the disk. Thus, it is important that the position of the heads be well-controlled for proper reading and writing from the disk.

In order to facilitate effective operation of hard disk drives, internal components of a hard disk drive, including the head disk assembly (HDA) and a printed circuit board assembly (PCBA), are typically enclosed within and appropriately secured to a metallic housing. Use of metallic materials for the housing has been thought necessary in order to provide, for example, dimensional stability when operating the hard disk drive. The slightest movement of what are intended to be fixedly secured components during operation of the hard disk drive can lead to its catastrophic failure.

Without mechanical spinning components therein, manufacturers of flash drives have taken advantage of the benefits of, for example, a plastic case for enclosure of the drive. See, for example, U.S. Pat. No. 7,301,776, which describes how metallic material used for top and bottom plates of the flash memory devices described therein can be replaced by plastic. However, such advantages have not yet been realized in hard disk drives where mechanical spinning components are employed.

In view of the number of potential problems impacting effective and long-term performance of hard disk drives, alternative methods and apparatus for hard disk drives are desired. Particularly desired are alternatives to conventional hard disk drives comprising metallic housings having internal components mounted directly on the base of the housing.

SUMMARY OF THE INVENTION

A hard disk drive of the invention comprises: a housing comprising a base and a cover; an insert positioned on an interior surface of the base of the housing for stabilization of one or more components within the hard disk drive during operation of the hard disk drive, wherein the insert is relatively stiff as compared to stiffness of the base; and the at least one of the one or more components mounted on the insert. A hard disk drive rack assembly of the invention, where advantages of the invention can be magnified, comprises at least two of the hard disk drives of the invention.

Advantages associated with non-metallic housings can be realized by implementing the present invention in hard disk drives comprising non-metallic housings. In one embodiment, the base comprises plastic. In one embodiment, the insert comprises stainless steel. In another embodiment, the insert comprises a ceramic. According to a further embodiment, the insert is coated with a damping elastomer.

According to one aspect of the invention, the one or more components mounted to the insert comprise a rotary actuator. For example, the rotary actuator is mounted on the insert through its actuator shaft in one embodiment.

According to another aspect of the invention, the one or more components comprise a spindle assembly. For example, the spindle assembly is mounted on the insert through its spindle shaft in one embodiment.

In one embodiment, at least two of the one or more components are mounted at spaced apart positions on the insert such that their position relative to each other is stabilized during operation of the hard disk drive. For example, in one embodiment, a spindle shaft and an actuator shaft are mounted on the insert such that they are essentially stationary within the hard disk drive, but with corresponding disks and support arms being mounted to rotate relative to their respective shafts. According to a further embodiment, at least one of the spindle shaft and the actuator shaft is integrally formed at its respective position on the insert.

In one embodiment, the insert is adhesively secured to the base. In another embodiment, the insert is secured to the base with one or more mechanical fasteners. In yet another embodiment, the insert is molded into the base. In a further embodiment, the insert comprises a heat sink. According to one aspect of this embodiment, one or more fins on the insert protrude from the base to function as the heat sink.

A method of forming a hard disk drive of the invention comprises steps of: providing the base of the housing; providing the insert; positioning and securing the insert on the base; and mounting the one or more components on the insert for positional stabilization of the one or more components within the hard disk drive during operation of the hard disk drive.

Another method of forming a hard disk drive of the invention comprises steps of: providing the insert; insert-molding the insert within the base of the housing; and mounting the one or more components on the insert for positional stabilization of the one or more components within the hard disk drive during operation of the hard disk drive.

BRIEF DESCRIPTION OF THE DRAWINGS

Note that the components and features illustrated in all figures throughout this application are not necessarily drawn to scale and are understood to be variable in relative size and placement. Similarly, orientation of many of the components and features within the figures can vary such that, for example, a horizontal configuration could be readily reoriented to a vertical configuration, and vice versa, as desired.

DETAILED DESCRIPTION OF THE PREFERRED EMBODIMENTS OF THE INVENTION

A disk drive assembly conventionally includes a base to which various components of the disk drive are mounted. A top cover cooperates with the base to form a housing that defines an encased environment for the disk drive. Any disk drive comprises any of a number of suitable components encased within the housing. The components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
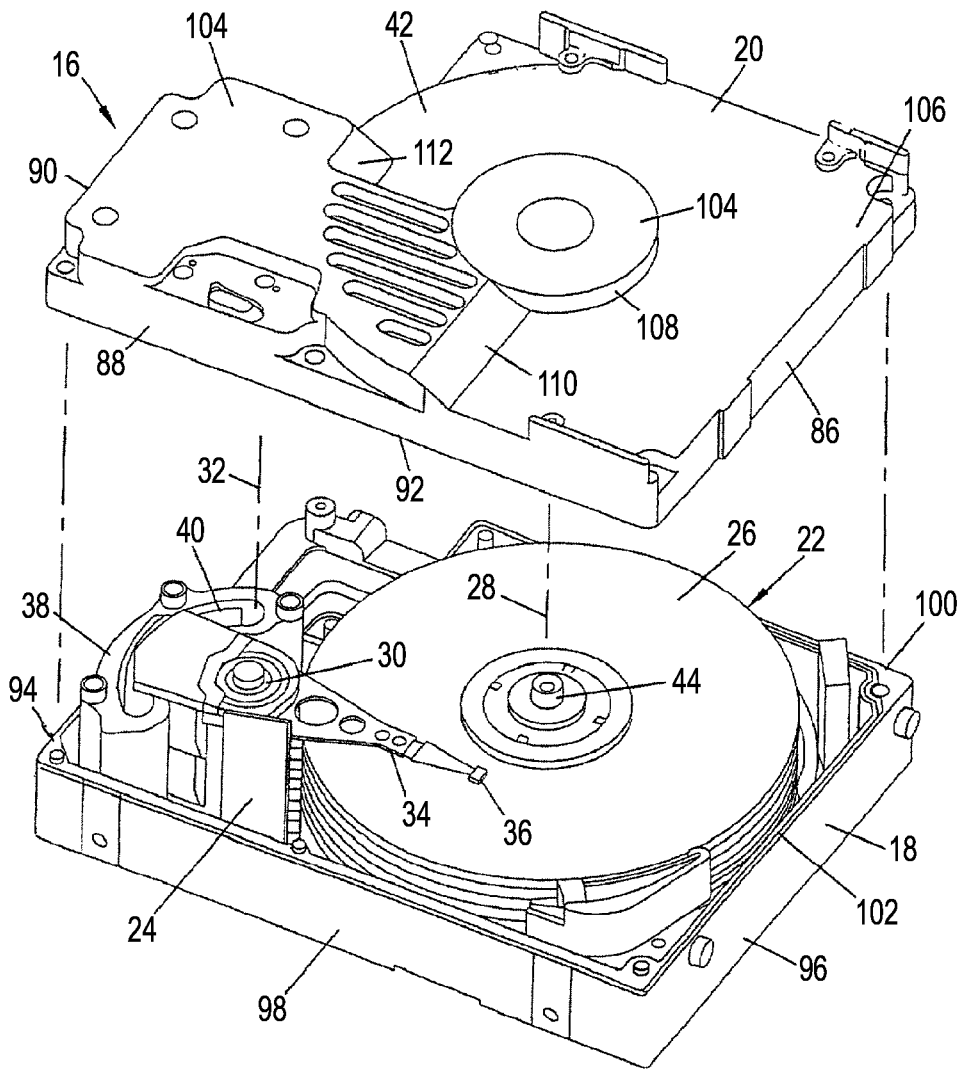
FIG. 1 is a partial perspective view of a prior art hard disk drive with the top cover of the drive housing removed to illustrate certain features.

Turning now to the drawings, there is shown in FIG. 1 part of a prior art hard disk drive 16 described in U.S. Patent Publication No. 2003/0223148. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing formed by the base 18 and cover 20. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Several transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at any desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a poll piece (both of which are not illustrated in further detail).

The rotary actuator 24 and spindle assembly 22 are supported between two opposed housing walls, including a top wall 42 of the cover 20 and a bottom wall of the base 18. Spindle shaft 44 and the actuator shaft 30 may be stationary—meaning that they are integral with the housing—with the disks and support arms being mounted to rotate relative to their respective shafts.

The cover 20 includes a vertical continuous sidewall structure including a rearward wall 86, a sidewall 88, and a forward wall 90. Here, the upper sidewall structure includes a generally flat, horizontal continuous bottom edge 92, though some embodiments may include a flange or other mated fitting so as to fit into a top edge 100 of base 18 facilitating a tight fit and/or laser-welding. The base 18 includes an upright wall structure including a forward wall 94, a rearward wall 96, and two opposed sidewalls, one of which is shown at 98. These walls combine to form a continuous, horizontal top edge 100. FIG. 1 also illustrates an elastomeric gasket seal 102 mounted to top edge 100 of the base 18. When the cover 20 is assembled onto the base 18, the confronting bottom edge 92 of the cover 20 and the top edge 100 of the base 18 are brought into sealing engagement to close the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110 and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a somewhat reduced thickness wall construction.

The present invention is beneficially implemented within hard disk drives comprising non-metallic housings. It is to be understood that non-metallic hard disk drive housings may include metal, but such metal is only included in a minor proportion as compared to the housing in its entirety. While the present invention can be implemented in hard disk drives comprising conventional metallic housings, such implementation is relatively inefficient and redundant. Thus, focus of the description of the invention is on its implementation in hard disk drives comprising non-metallic housings as benefits associated with the invention are marked in that application.

Several advantages are obtained by fabricating a hard disk drive housing (e.g., including a base component and a cover component) from a material that is lighter in weight than metal. Lighter weight materials include, for example, ceramics, plastics, and many composites (e.g., metal matrix composites and glass-filled particulate plastics). The lighter weight provided by these materials translates into lighter weight assemblies including the hard disk drive, which makes for not only often more desirable features for the user of such assemblies but also beneficially reduces manufacturing and shipping costs associated with such assemblies. As a further example, use of moldable materials facilitates design flexibility in that many performance-enhancing features can be directly molded within components of the housing. Examples of such features and hard disk drives comprising non-metallic housings are described in co-pending U.S. patent application Ser. No. 13/096,480, entitled "Metal-Coated Hard Disk Drives and Related Methods," incorporated by reference herein in its entirety. Suitable plastic materials include, for example, polycarbonate and polybutylterepthalate.

Figure 2A:
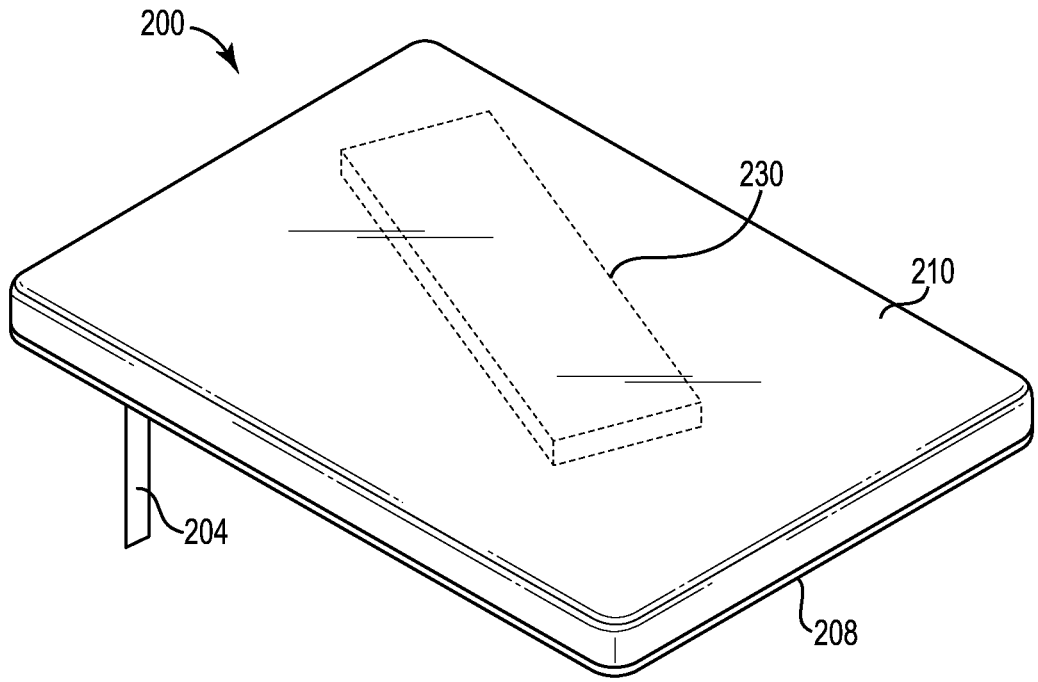
FIG. 2A is a partial phantom top perspective view of one embodiment of a hard disk drive of the invention.
Figure 2B:
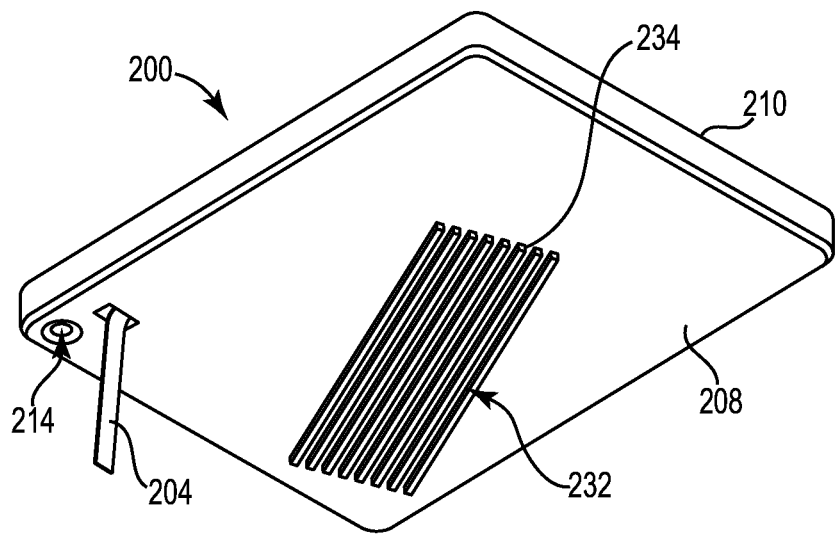
FIG. 2B is a bottom perspective view of the hard disk drive of FIG. 2A.

According to one embodiment of the present invention, as illustrated in FIGS. 2A-2B, an insert 230 is positioned on an interior surface of a base 208 of the hard disk drive housing 200 for stabilization of one or more components (not shown) within the hard disk drive. By use of the terms "stabilization," "stabilized," and the like with respect to hard disk drive components, it is to be understood that changes in movement and relative positioning of that component with respect to other components are minimized. Relative positioning of the components is susceptible to undesired movement and change when, for example, the hard disk drive is operating with mechanical components spinning therein. Increased stability (e.g., positional stability) between components in the hard disk drive translates into damping of vibrations that can be introduced through rotation of disks within the hard disk drive. Problematic harmonics from such vibrations become even more evident upon operation of multiple hard disk drives connected within a rack. Thus, benefits offered by hard disk drives of the invention are magnified when multiple hard disk drives of the invention are connected within a rack.

Figure 2C:
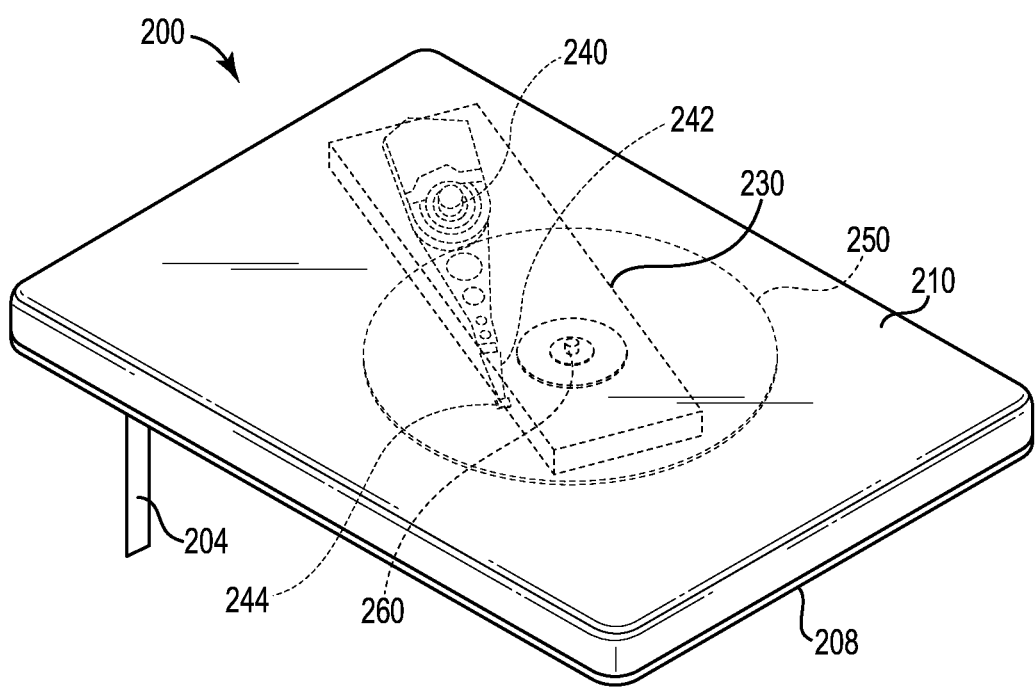
FIG. 2C is a further partial phantom top perspective view of the hard disk drive of FIG. 2A.

In one embodiment, as illustrated in FIG. 2C, a component stabilized by the insert 230 comprises a rotary actuator comprising an actuator shaft 240, such as the actuator shaft 30 illustrated in prior art FIG. 1. A transducer support arm 242 is fixed to rotate with the rotary actuator and carries a magnetic data transducing head 244. The rotary actuator pivots to move the transducing head 244 along arcuate paths generally radially with respect to disks 250 within the hard disk drive. In another embodiment, a component stabilized by the insert 230 comprises a spindle assembly comprising a spindle shaft 260, such as the spindle shaft 44 illustrated in prior art FIG. 1.

Benefits are realized when one or more components are mounted at spaced apart positions on the insert 230 such that their position relative to each other is stabilized by the relatively stable insert 230 to which each is mounted during operation of the hard disk drive. Preferably, both the rotary actuator and the spindle assembly are stabilized by the insert 230 in a coordinated manner. As such, the rotary actuator and the spindle assembly are each mounted on the insert 230 at spaced apart positions. The position at which each component is mounted on the insert 230 generally corresponds to the position on the base 208 to which the component would otherwise be mounted in the absence of the insert 230.

In the exemplary embodiment illustrated in FIG. 2C, the rotary actuator is mounted on the insert 230 through its actuator shaft 240 and the spindle assembly is mounted on the insert 230 through its spindle shaft 260. According to this embodiment, the spindle shaft 260 and the actuator shaft 240 are mounted such that they are essentially stationary within the hard disk drive 200, but with corresponding disks 250 and support arms 242 being mounted to rotate relative to their respective shafts 260, 240. According to a further embodiment, the actuator shaft 240 is integrally formed at its respective position on the insert 230, obviating the need for a separate mounting mechanism at that position, increasing processing efficiency, and further increasing stability of the component within the hard disk drive.

The insert 230 comprises any suitable shape to provide desired positional stability between the rotary actuator and spindle assembly of the hard disk drive. Positional stability is imparted due, in part, to relative stiffness of the insert 230 as compared to stiffness of the material (e.g., plastic) forming the portion of the hard disk drive housing 200 on which the insert 230 is secured. Generally, the insert 230 comprises any suitable material. In an exemplary embodiment, the insert 230 comprises a ceramic or stainless steel.

In a further embodiment, the insert 230 is coated with a damping elastomer prior to being positioned on the base 208. Advantageously, such an insert 230 can function as a damped metal laminate, being selectively and precisely positioned within the hard disk drive, obviating the need for an entire hard disk drive cover 210 or housing 200 to be formed of a damped metal laminate and providing an associated weight savings.

The insert 230 is secured to the base 208 of the housing 200 using any suitable mechanism. In one embodiment, the insert 230 is adhesively secured to the base 208. In another embodiment, the insert 230 is secured to the base 208 with one or more mechanical fasteners (e.g., screws). In an exemplary embodiment, the insert 230 is molded (e.g., insert-molded) into the base 208 of the housing 200 as illustrated in FIGS. 2A-2C.

According to a further embodiment, the insert 230 comprises a heat sink 232, such as that illustrated in FIG. 2B. According to this embodiment, one or more fins 234 on the insert 230 protrude from the base 208 to function as the heat sink 232 to dissipate excess heat from within the hard disk drive. In an exemplary embodiment, where the hard disk drive housing 200 comprises a metal coating (such as that described in co-pending U.S. patent application Ser. No. 13/096,480, entitled "Metal-Coated Hard Disk Drives and Related Methods," but not shown on the base 208 of the hard disk drive housing 200 illustrated in FIGS. 2A-2B), incorporation of an insert 230 with fins 234 in this manner facilitates thermal conductivity and enhances performance of the modified insert 230 as a heat sink.

In order to further bolster stability of internal components mounted on a non-metallic hard disk drive housing 200, components of the housing 200 are snap-coupled together as described in co-pending U.S. patent application Ser. No. 13/096,862, entitled "Improved Coupling of Hard Disk Drive Housing and Related Methods," incorporated by reference herein in its entirety. When snap-fit together according to this further embodiment, components of the housing 200 are placed under tension, which advantageously increases stiffness of the material (e.g., plastic) comprising the same. When stiffness of the material increases, so does its strength and its ability to provide stability with respect to components mounted thereon.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A hard disk drive, comprising:
a housing comprising a non-metallic base and a cover;
an insert positioned on an interior surface of the base of the housing for stabilization of one or more components within the hard disk drive during operation of the hard disk drive and comprising a heat sink, wherein the insert is relatively stiff as compared to stiffness of the base; and
the at least one of the one or more components mounted on the insert, wherein the heat sink outwardly protrudes from the base to an exterior of the hard disk drive.

2. The hard disk drive of claim 1, wherein at least two of the one or more components are mounted at spaced apart positions on the insert such that their position relative to each other is stabilized during operation of the hard disk drive.

3. The hard disk drive of claim 1, wherein the base comprises plastic.

4. The hard disk drive of claim 1, wherein the insert comprises stainless steel.

5. The hard disk drive of claim 1, wherein the insert comprises a ceramic.

6. The hard disk drive of claim 1, wherein the insert is coated with a damping elastomer.

7. The hard disk drive of claim 1, wherein the one or more components comprise a rotary actuator.

8. The hard disk drive of claim 7, wherein the rotary actuator is mounted on the insert through its actuator shaft.

9. The hard disk drive of claim 1, wherein the one or more components comprise a spindle assembly.

10. The hard disk drive of claim 9, wherein the spindle assembly is mounted on the insert through its spindle shaft.

11. The hard disk drive of claim 1, wherein a spindle shaft and an actuator shaft comprise the one or more components and are mounted on the insert such that they are essentially stationary within the hard disk drive, but with corresponding disks and support arms being mounted to rotate relative to their respective shafts.

12. The hard disk drive of claim 11, wherein at least one of the spindle shaft and the actuator shaft is integrally formed at its respective position on the insert.

13. The hard disk drive of claim 1, wherein the insert is adhesively secured to the base.

14. The hard disk drive of claim 1, wherein the insert is molded into the base.

15. A method of forming the hard disk drive of claim 1, comprising steps of:
providing the base of the housing;
providing the insert;
positioning and securing the insert on the base; and
mounting the one or more components on the insert for positional stabilization of the one or more components within the hard disk drive during operation of the hard disk drive.

16. A method of forming the hard disk drive of claim 1, comprising steps of:
providing the insert;
insert-molding the insert within the base of the housing; and
mounting the one or more components on the insert for positional stabilization of the one or more components within the hard disk drive during operation of the hard disk drive.

17. A hard disk drive, comprising:
a housing comprising a non-metallic base and a cover;
an insert positioned on an interior surface of the base of the housing for stabilization of one or more components within the hard disk drive during operation of the hard disk drive and comprising a heat sink, wherein the insert is relatively stiff as compared to stiffness of the base; and
the at least one of the one or more components mounted on the insert, wherein one or more fins on the insert protrude from the base to an exterior of the hard disk drive to function as the heat sink.

18. The hard disk drive of claim 17, wherein the insert comprises stainless steel or ceramic.

19. The hard disk drive of claim 17, wherein the insert is coated with a damping elastomer.

* * * * *